Patented Dec. 25, 1951

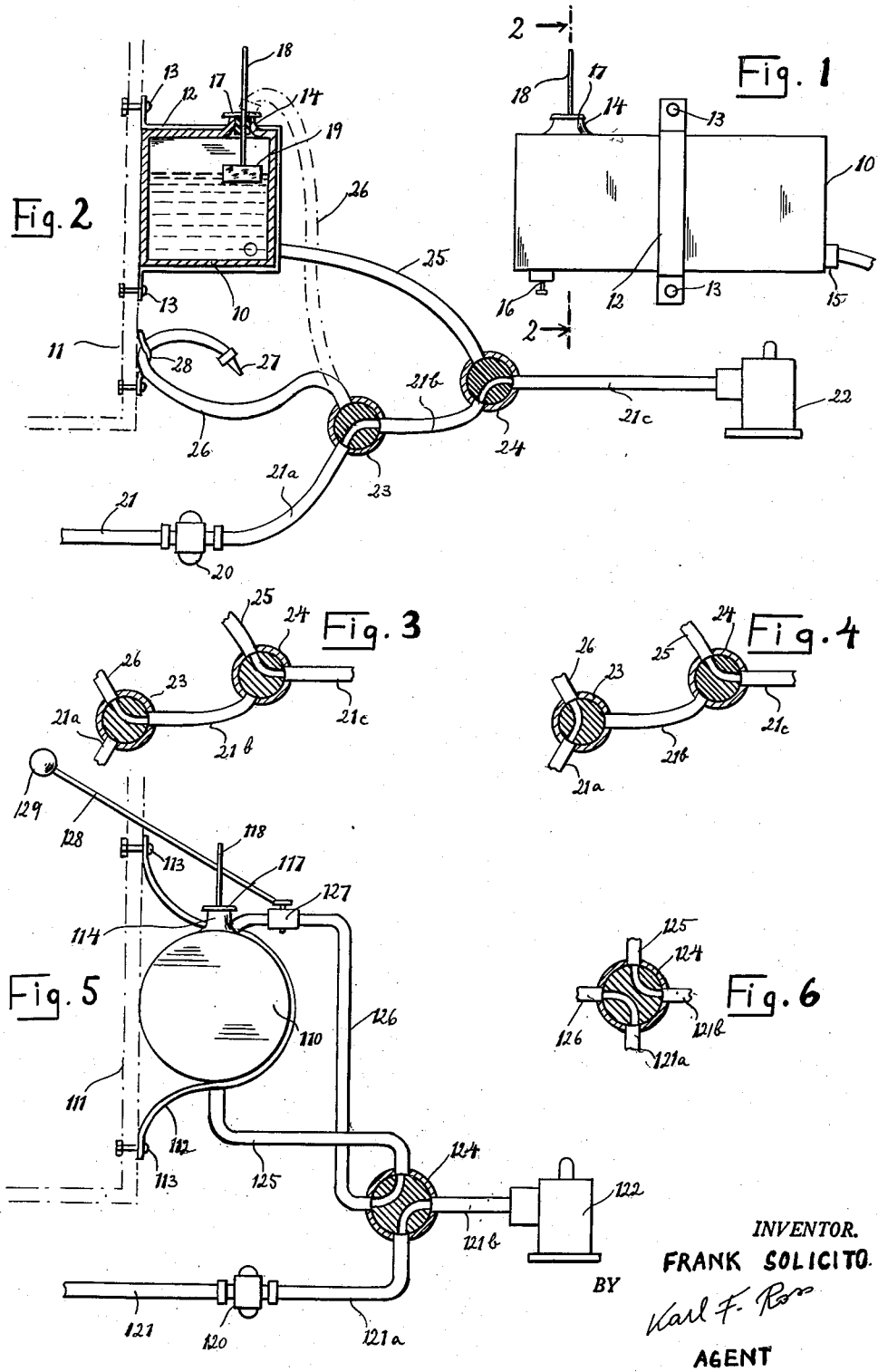

2,579,979

UNITED STATES PATENT OFFICE 2,579,979

EMERGENCY FUEL TANK

Frank Solicito, Bronx, N. Y., assignor of one-half to Philip P. Goodkin, New York, N. Y.

Application January 22, 1949, Serial No. 72,155

2 Claims. (Cl. 158—46.5)

1

The present invention relates to emergency fuel tanks for automotive vehicles, more particularly for automotive vehicles wherein fuel is supplied to a carburetor from a fuel tank by means of a fuel pump.

In such vehicles it sometimes happens that a motorist, through his own inadvertence or through the existence of a leak in his gasoline tank or fuel line, suddenly runs out of gasoline in a locality where fuel is not available within walking distance, or that the vehicle stalls for want of fuel in such a position as to present a serious impediment to traffic. Similar inconveniences may result from a failure of the fuel pump, or from an obstructed fuel line due to contaminating matter which may have found its way into the tank.

An object of the present invention is to provide, in an automotive vehicle of the type described, means for temporarily and immediately restoring the fuel supply in any of the above-indicated eventualities, thereby obviating the various inconveniences set forth.

Another object of my invention is to provide, in combination with an emergency fuel tank for automotive vehicles having a fuel pump, means for quickly and efficiently refilling the emergency tank from the main tank after the emergency necessitating a switching to the emergency tank has passed.

A further object of this invention is to provide a method of automatically refilling an emergency fuel tank through the fuel pump of a vehicle of the character described.

The invention will be fully understood from the following description of certain embodiments, reference being had to the accompanying drawing in which:

Fig. 1 is a front elevation of an emergency fuel tank according to the invention;

Fig. 2 is a somewhat diagrammatic view of a fuel supply system according to the invention, with the tank shown in section along the line 2—2 of Fig. 1;

Fig. 3 shows certain valves of the system of Fig. 2 in emergency operating position;

Fig. 4 shows the same valves in position for refilling the tank; Fig. 5 is a view similar to Fig. 2, showing a somewhat modified system and tank; and Fig. 6 shows a valve of the system of Fig. 5 in emergency operating as well as refilling position.

Referring to Figs. 1 and 2, there is shown an emergency fuel tank 10 adapted to be secured to the body of an automobile or truck, indicated at 11, in any convenient position above the level of the carburetor, for example inside the hood (not shown) of the vehicle, by means such as a metal

2 strap 12 and screws 13. The tank 10, in the embodiment referred to, is of square cross section and is provided with an inlet 14 and an outlet 15, as well as a drain valve 16. The inlet 14 is provided with a suitable plug 17 which is perforated and traversed by an indicator rod 18 secured to a float 19, for example a piece of cork.

The vehicle 11 is provided with a conventional fuel pump 20 connected to a fuel line 21 which leads to the normal or principal gasoline tank, not shown. Fuel pump 20 is normally connected to the carburetor 22 by way of a pipe 21a, a first three-way valve 23, a pipe 21b, a second three-way valve 24 and a pipe 21c. The remaining outlet of valve 24 is connected to the outlet 15 of tank 10, through the intermediary of a pipe 25, while the remaining outlet of valve 23 is connected to a flexible tube 26. Tube 26 is provided with a nipple 27 adapted to fit into the tank inlet 14 and may, when not in use, be suspended by any suitable means such as a clip 28.

When the vehicle runs normally, the valves 23, 24 are in the position shown in Fig. 2 and thus gasoline may freely travel from the main tank through the fuel pump 20 to the carburetor 22. If, for some reason, the pump ceases to deliver, the valves 23 and 24 are rotated counter-clockwise through an angle of 120° until they occupy the position shown in Fig. 3. In this position fuel from the emergency tank 10 can flow by gravity to the carburetor by way of pipe 25, valve 24 and pipe 21c, the outlet from the fuel pump being shut off at valve 23.

After the emergency has passed, e. g. by refilling the main tank or repairing the fuel pump, it will be desirable to refill the emergency tank 10 for future use. Such refilling may, of course, be carried out by hand, through the inlet 14 after removal of the plug 17 and indicator 18, 19, and in such case it will be advisable to re-set the valves to their position shown in Fig. 2. The invention, however, provides a novel method of filling the tank 10 automatically from the main gasoline tank with the aid of the pump 20.

It is clear that, in order to operate the pump 20, it will be necessary to supply fuel to the carburetor 22 so as to keep the motor running after the same has been started by means of the conventional starter or hand crank, inasmuch as the pump derives its power from the motor. In order to refill the tank 10, I place the valves 23 and 24 in the position shown in Fig. 4 in which pipe 21a communicates with tube 26 and pipe 25 is connected to pipe 21c. Next the nipple 27 of the flexible tube 26 is introduced into the inlet 14 (after removal of plug 17) as indicated in chain-dotted lines in Fig. 2. Assuming that the tank 10 has not been emptied completely, fuel from this tank will flow by gravity to the carburetor 22 by way of pipe 25, valve 24 and pipe 21c, while at the same time gasoline from the main tank will enter tank 10 through fuel line 21, pump 20, pipe 21a, valve 23 and tube 26. It will be understood that the consumption of gasoline by the carburetor, with the motor running substantially without load, will be a mere fraction of that delivered to the tank 10 by the pump, so that the latter tank can be refilled quickly and without material expenditure of fuel.

Fig. 5 shows a cylindrical fuel tank 110 secured to the body 111 of the vehicle by means of one or more straps 112 and screws 113. The tank 110 has an inlet 114, connected to a pipe 126, and an outlet to which a pipe 125 is attached. Inlet 114 is again provided with a suitable plug 117 traversed by an indicator rod 118. The fuel pump 120 is connected to the main tank (not shown) by way of a fuel line 121 and to the carburetor 122 by way of a pipe 121a, a four-way valve 124 and a pipe 121b.

In its normal position (Fig. 5) the valve 124 connects the pipe 121a to pipe 121b and the pipe 125 to pipe 126, the latter connection being without effect. In the position of Fig. 6, wherein the valve 124 has been rotated through an angle of 90° from the position shown in Fig. 5, emergency feed is obtained by the connection between pipes 125 and 121b while the connection between pipes 126 and 121a will be without effect as long as pump 120 remains inoperative for any of the reasons enumerated above. After the defect has been remedied, the valve remains in its position but fuel from the pump 120 can now flow into the tank 110 in order to refill the same in the manner previously described.

The arrangement of Fig. 5 may, of course, be designed in such manner that operation of the vehicle will be possible with the valve 124 permanently in the position of Fig. 6, yet in such case it will be desirable to connect the indicator 118 with the dashboard in order to signal when the carburetor begins to draw on the fuel content of tank 110.

A shut-off valve 127 may be inserted in the line 126 for the purpose of blocking the connection between valve 124 and inlet 114, for example when the use of the emergency tank 110 has been necessitated by the contamination of the main fuel tank, in which case it will not be desirable to transfer any of its contents to the emergency tank.

It will be understood that the various valves may be designed so as to be accessible only upon opening of the hood but that, if desired, some or all of them may also be provided with operating means for controlling their position from the dashboard. This has been illustrated, by way of example, for the valve 127 in the form of an operating rod 128 having a knob 129 affixed thereto.

It will further be appreciated that the tank need not be of either of the two specific forms illustrated, and that the invention is not limited to the precise embodiments shown and described, being on the contrary capable of numerous modifications and adaptations without exceeding its scope as defined in the objects and in the appended claims.

I claim:

1. In an automotive vehicle having a carburetor and a fuel pump, in combination, an emergency fuel tank provided with an inlet and with an outlet located above the level of the carburetor, valve means including a valve comprising a casing, said casing having at least three openings, and a rotor inside said casing, said rotor being provided with a channel, a first conduit connecting said fuel pump directly to one of said openings, a second conduit connecting said outlet to another of said openings, and a third conduit connecting said carburetor to a third of said openings, said valve having a first position in which said channel connects said first conduit to said third conduit, said valve simultaneously disconnecting said second conduit from each of the other of said conduits, thereby establishing a path for fuel between the fuel pump and the carburetor, said valve having a second position in which said channel connects said second conduit to said third conduit, said valve simultaneously disconnecting said first conduit from each of the other of said conduits, thereby establishing a path for fuel between the emergency fuel tank and the carburetor, a fourth conduit connecting said valve means directly to said emergency tank, and means including said valve means, said inlet and said fourth conduit for establishing a path for fuel delivered by said pump and passing through said emergency fuel tank to said carburetor in said second position of said valve.

2. In an automotive vehicle having a carburetor and a fuel pump, in combination, an emergency fuel tank provided with an inlet and with an outlet located above the level of the carburetor, a valve comprising a casing, said casing having four openings, and a rotor inside said casing, said rotor having a first and a second channel, a first conduit connecting said fuel pump to one of said openings, a second conduit connecting said outlet to another of said openings, a third conduit connecting said carburetor to a third of said openings, and a fourth conduit connecting said inlet to a fourth of said openings, said valve having a first position in which said first channel connects the first conduit with the third conduit, thus providing a path for the passage of fuel between said pump and said carburetor, said second channel simultaneously connecting the second and the fourth conduit, thereby disconnecting said fuel tank from said pump and said carburetor, said valve having a second position in which one of said channels connects the first conduit with the fourth conduit and the other of said channels connects the third conduit with the second conduit, thus establishing a path for fuel delivered by said pump and passing through said emergency fuel tank to said carburetor.

FRANK SOLICITO.

REFERENCES CITED

The following references are of record in the file of this patent:

UNITED STATES PATENTS

| Number | Name | Date |
| --- | --- | --- |
| 1,465,189 | Steward | Aug. 14, 1923 |
| 1,829,277 | Haase et al. | Oct. 27, 1931 |
| 2,088,316 | Alvarez | July 27, 1937 |
| 2,215,680 | Wiley et al. | Sept. 24, 1940 |
| 2,497,277 | Siegel | Feb. 14, 1950 |

FOREIGN PATENTS

| Number | Country | Date |
| --- | --- | --- |
| 505,909 | France | May 17, 1920 |
| 438,854 | Germany | Dec. 28, 1926 |